Dec. 5, 1944.   C. R. TURNER   2,364,175
TOASTER
Filed May 18, 1942   4 Sheets-Sheet 1

Inventor:-
Charles Roger Turner
by his Attorneys
Howson & Howson

Dec. 5, 1944.     C. R. TURNER     2,364,175
TOASTER
Filed May 18, 1942     4 Sheets-Sheet 2
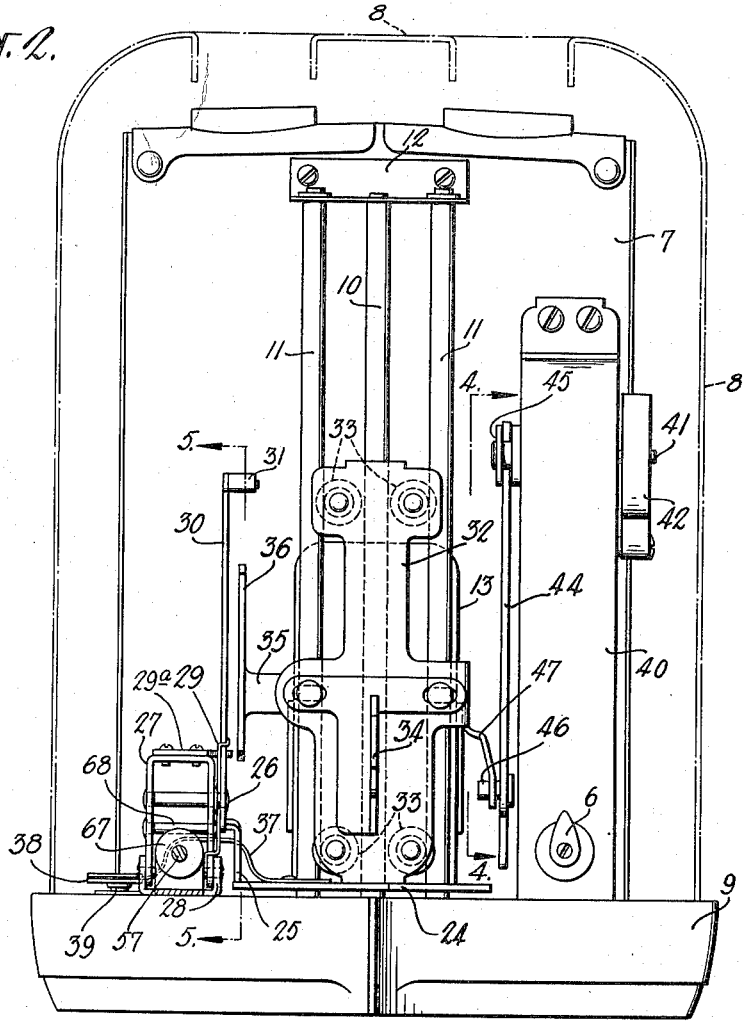
Inventor:-
Charles Roger Turner
by his Attorneys
Howson & Howson Dec. 5, 1944.  C. R. TURNER  2,364,175
TOASTER
Filed May 18, 1942  4 Sheets—Sheet 3

Inventor:—
Charles Roger Turner
by his Attorneys
Howson & Howson

Dec. 5, 1944.  C. R. TURNER  2,364,175
TOASTER
Filed May 18, 1942  4 Sheets-Sheet 4

Inventor:-
Charles Roger Turner
by his Attorneys
Howson & Howson

Patented Dec. 5, 1944

2,364,175

UNITED STATES PATENT OFFICE 2,364,175

TOASTER

Charles Roger Turner, Philadelphia, Pa., assignor to Proctor & Schwartz, Inc., Philadelphia, Pa., a corporation of Pennsylvania Application May 18, 1942, Serial No. 443,509

11 Claims. (Cl. 99—327)

This invention relates to automatic toasters, and more particularly to toasters of the type which enable the user to obtain any desired color and any desired degree of crispness of the toast.

In the copending application of Joseph W. Myers, Serial No. 415,455, filed October 17, 1941, there is disclosed a toaster of this general type in which both the time duration of the toasting cycle and the rate of toasting are controllable to obtain the desired color and the desired degree of crispness of the toast, and in which the toasting time and the toasting rate are correlated so that the desired color may be obtained irrespective of the crispness setting. By the present invention, there is provided a novel toaster which utilizes the same principles.

The principal object of the present invention is to provide a toaster of this general type which is extremely simple in construction and operation and which is highly efficient in operation.

Another object of the invention is to provide a toaster of this type in which the average rate of toasting throughout the toasting cycle is varied by varying the energy input to the toaster.

A further object of the invention is to provide a toaster of this type in which the energy input is varied throughout the toasting cycle by variable intermittent energization of the toaster.

Still another object of the invention is to provide a toaster of this type in which the duration of the toasting cycle is controlled by a variable-speed clockwork and the average toasting rate is controlled by an adjustable energy input controlling means, and in which the toasting time and the toasting rate are correlated by novel means provided for this purpose.

Other objects and features of the invention will be apparent hereinafter.

In the accompanying drawings:

Fig. 2 is an elevational view of the front end of the toaster with the cover shown in dot-and-dash outline and with the parts in operative position;

Fig. 7 is a diagrammatic illustration of the toaster circuit;

Figure 1:
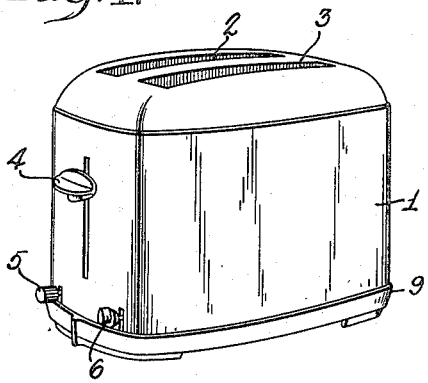
Fig. 1 is a perspective view of a toaster embodying the invention.

Referring first to Fig. 1, there is shown a toaster 1 of the well-known two-well type having adjacent bread-wells 2 and 3 within which there is a movable bread carriage (not visible) which is manually movable to the bread-toasting position by means of the knob 4. As is usual in present day toasters of this type, the carriage is automatically latched in the bread-toasting position by means described hereinafter and it is automatically released at the end of the toasting cycle and is spring-moved upwardly to eject the toast. In the toaster illustrated, the degree of crispness or texture of the toast is variable in response to adjustment of the rotatable knob 5 and the color of the toast is variable in response to adjustment of the rotatable knob 6, by means of the mechanism described hereinafter.

Figure 3:
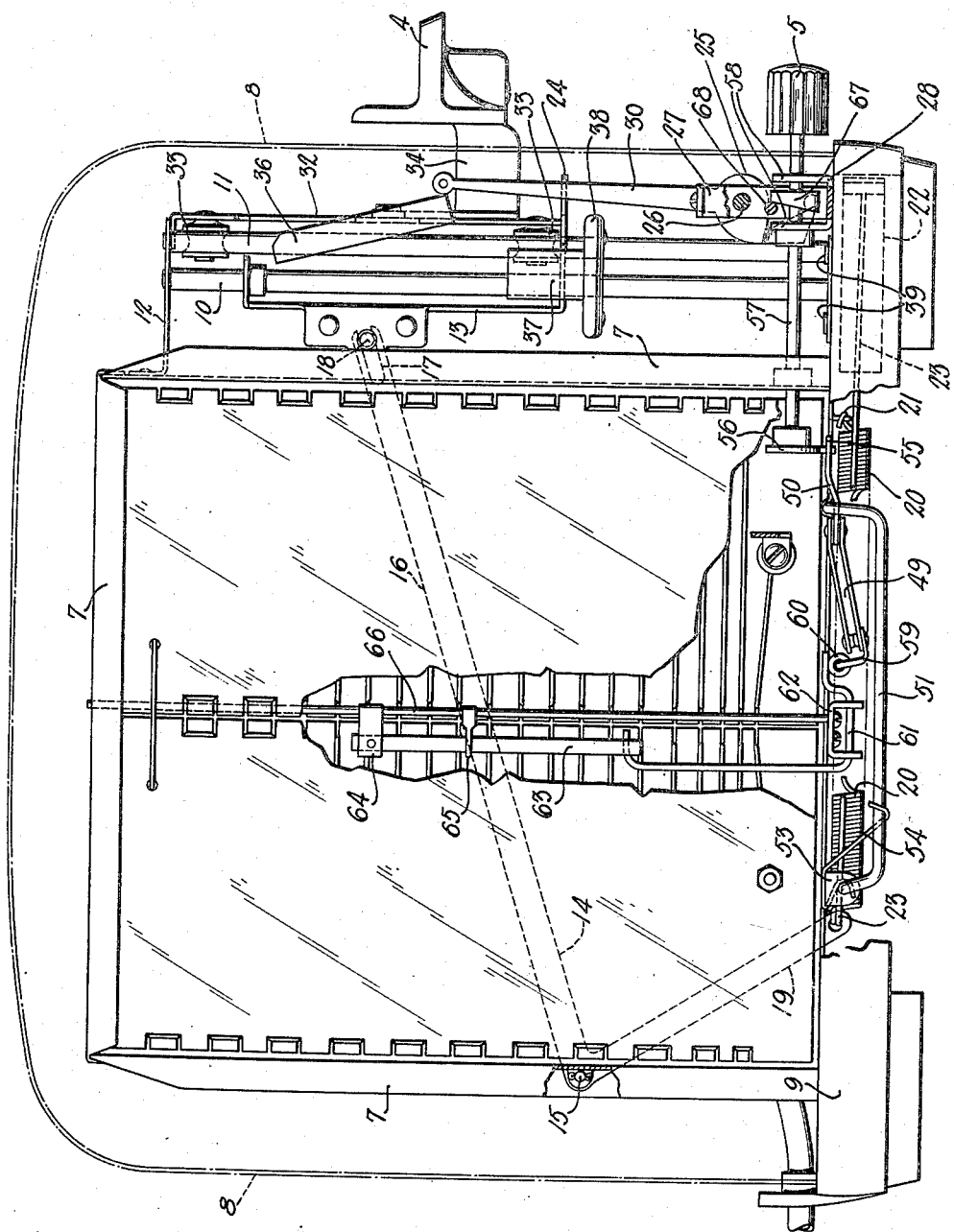
Fig. 3 is an elevational view taken from the left side of the toaster, with one of the heating units broken away for the sake of illustration and with the parts in inoperative position.

Referring now particularly to Figs. 2 and 3, the toaster comprises the usual framework 7 and cover 8 mounted on a suitable base 9. At the front or control end of the toaster, there is provided a centrally disposed rod 10 and a pair of spaced rods 11, all supported by the base 9 and by a bracket 12 carried by the framework 7. A bread carriage support 13 is slidably mounted on rod 10 and carries the bread-supporting elements which extend into the two wells of the toaster. A bell-crank lever 14 (Fig. 3) is pivoted at 15 on the toaster framework. The arm 16 of the bell-crank lever extends forwardly of the toaster between the two bread wells and has its end slotted at 17 to receive a pin 18 carried by support 13. The other arm 19 of the bell-crank lever extends downwardly to a point below the toaster body. A heavy coil spring 20 has one end connected to the end of arm 19 and has its other end anchored to the toaster framework at 21. The spring 20 urges the bell-crank counter-clockwise, as viewed in Fig. 3, thereby urging the carriage support 13 upward. Preferably, the upward movement of the bread carriage, under the impetus of the spring 20, is retarded by means of a dash-pot 22 including a movable piston with an elongated stem or rod 23 connected to the end of arm 19.

Figure 5:
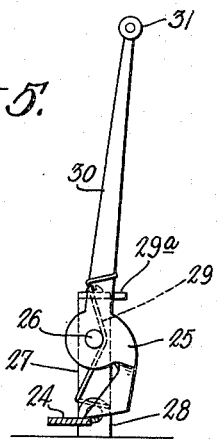
Fig. 5 is a detail sectional view taken along line 5—5 of Fig. 2.

The carriage support 13 has an extension 24 at its lower end which is engageable by a pivoted latch member 25 (see Fig. 5) to latch the bread carriage in its lowermost position against the action of spring 20. The latch member 25 is pivoted at 26 on an inverted U-shaped bracket 27 (Fig. 2) which, in turn, is pivotally mounted on a bracket 28 carried by the base 9. The purpose of this mounting will be apparent later. The latch member 25 is urged to latching position by a spring 29. A stop element 29a mounted on bracket 27 limits the rotation of member 25 by spring 29. The latch member has an upwardly-extending arm 30 which carries a roller 31 at its upper end, the purpose of which will be explained later.

A carriage 32 is freely and slidably mounted on rods 11 by means of rollers 33 on the carriage which engage the said rods. A forwardly-extending arm 34 on the carriage 33 carries the knob 4, previously mentioned. The carriage 32 is free of attachment to the bread carriage support 13, but its lower end rests upon the extension 24 of support 13 so that when the knob 4 is depressed, the carriage 32 moves support 13 downwardly. Secured to the carriage 32 is a member 35 which carries a cam plate 36 arranged cooperatively with the roller 31. The purpose of the cam plate 36 is to actuate the latch member 25 toward non-latching position so as to release the bread carriage and terminate the toasting operation, as will be described further hereinafter.

The extension 24 of support 13 carries a resilient arm 37 (see Fig. 2), on the free end of which there is insulatingly mounted a contact plate 38 which is engageable with stationary contacts 39 mounted on the base 9 and insulated from one another. The contacts 38—39 constitute a switch which controls the toaster circuit, as shown in Fig. 7. When the support 13 is lowered and latched, as shown in Fig. 2, the switch 38—39 is closed, thereby energizing the toaster. When the support 13 is released at the end of the toasting operation, the switch 38—39 opens to deenergize the toaster.

The time duration of the toasting cycle is controlled by means of a variable-speed clockwork mechanism 40, and it is also controlled by the position of arm 30, as will be described hereinafter. The clockwork 40 may be of the conventional type commonly employed in toasters embodying time control of the toasting operation. Further, this device is preferably of the compensated type which embodies thermostatic compensating means for governing the operation of the device according to the general temperature of the toaster. The maximum period of the clock device is preferably five minutes or more, depending on the range of control desired. It is unnecessary to illustrate or describe the clockwork mechanism in detail. It suffices to state that the speed of the clockwork is controllable by the rotatable knob 6, thereby to vary the time duration of the toasting cycle. The clockwork mechanism includes a rotatable shaft 41 (Fig. 2) having an associated spring 42 which constitutes the energy-storing element of the device. As is well known, when the shaft 41 is rotated in one direction, energy is stored in the spring 42, and the stored energy is gradually released by the escapement mechanism of the clockwork to rotate the shaft 41 in the opposite direction, the rate of release of the energy being controllable by adjustment of knob 6.

Figure 4:
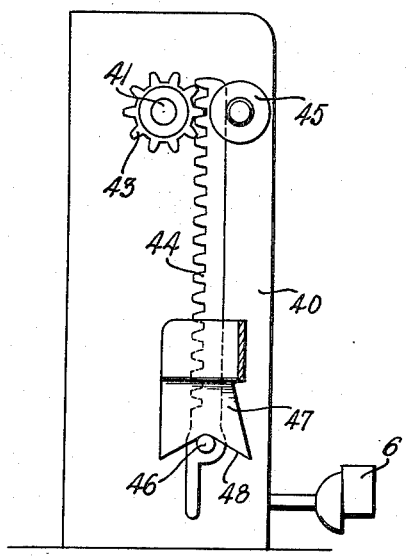
Fig. 4 is a detail sectional view taken along line 4—4 of Fig. 2.

On the end of shaft 41 opposite the spring 42, there is mounted a pinion 43 (see Fig. 4) which meshes with a gear rack 44 supported by a roller 45 in cooperation with the pinion 43. At the lower end of the rack 44, there is a projecting stud 46 which is engageable by an extending arm 47 (Figs. 2 and 4) on carriage 32, the said arm having a V-shaped end 48 for engagement with the pin 46. When the carriage 32 is depressed by means of knob 4, the rack is lowered and it rotates the shaft 41 by means of pinion 43 in a direction to store energy in the spring 42. When knob 4 is released, the shaft 41 is operated slowly in the opposite direction by the energy released from spring 42, and the rack 44 moves slowly upward and slowly raises the carriage 32. When the cam plate 36 engages roller 31 and cams the arm 30 forwardly, the latch member 25 releases the carriage support 13 to terminate the toasting operation.

Figure 6:
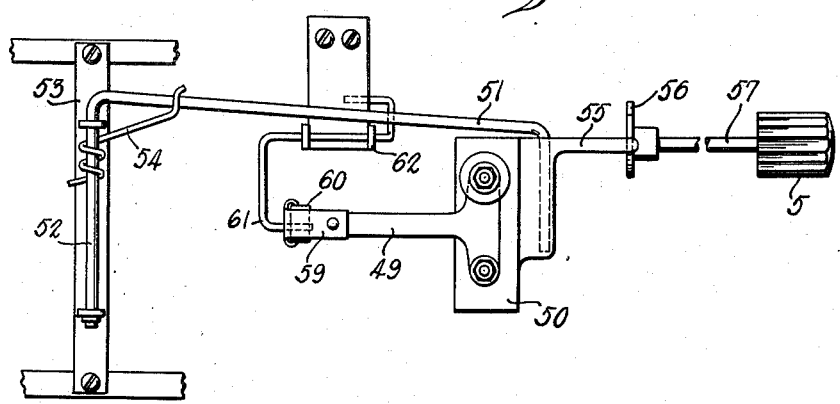
Fig. 6 is a bottom plan view of the adjustable thermostatic switch mechanism employed.

The average rate of toasting throughout the toasting cycle is controlled by the mechanism now to be described. A switch 49 (see Figs. 3 and 6) is carried by a supporting bracket 50 within the base of the toaster, and the bracket 50 is, in turn, carried by a rod 51 whose end 52 is pivotally mounted on a bracket 53 secured to the toaster framework. A spring 54 urges rod 51 counter-clockwise, as viewed in Fig. 3, thereby urging the switch upwardly. An extending finger 55 on bracket 50 is engaged by a cam 56 on the end of a rotatable shaft 57, the rear end of which is rotatably supported by the toaster framework, while the forward end of the shaft is rotatably supported by arms 58 of bracket 28. The cam 56 varies the position of switch 49 when shaft 57 is rotated. At its forward end, the shaft carries the knob 5 previously mentioned.

The lower arm of switch 49 carries an extension 59 on which an insulating bushing 60 is mounted. The bushing 60 is engaged by one end of a crank rod 61 pivotally carried by a bracket 62 secured to the toaster framework. The other end of rod 61 extends upward into one of the bread wells and is engageable by the free end of a bimetallic thermostatic element 63 supported by brackets 64 and 65 secured to stationary rod 66. The free portion of thermostatic element 63 flexes in response to the temperature within the well in which it is disposed and actuates the lower arm of switch 49 downwardly to open the switch. The switch is serially connected with the heating elements 66a in the toaster circuit, as shown diagrammatically in Fig. 7, and, therefore, it controls the energization of the toaster. Rotation of knob 5 varies the position of switch 49 relative to its thermostatic-actuating mechanism, and thereby varies the operation of the switch, as will be described in greater detail later.

As shown in Figs. 2 and 3, a cam 67 is mounted on shaft 57 within the bracket 28, and this cam engages a transverse pin 68 carried by bracket 27. The cam 67 serves to vary the position of bracket 27 and thereby varies the position of arm 30 and the roller 31. It will now be seen that the duration of the toasting cycle is dependent not only upon the speed of the clockwork 40, but also upon the position of roller 31 in relation to the cam plate 36. The variable positioning of arm 30, upon rotation of knob 5, serves to correlate the time duration of the toasting cycle with the rate of toasting so as to obtain the desired color of the toast, as determined by the setting of knob 6, irrespective of the setting of the crispness control knob 5.

The operation of the toaster as a whole is as follows. The operator chooses the setting of the knobs 5 and 6 according to the degree of crispness and color desired, and he inserts the bread slices in the bread wells. He then depresses knob 4, thereby lowering carriage 32 and the bread carriage support 13 until the latter is latched in its lowermost position by the latch member 25. The lowering of carriage 32 winds the clockwork 40, as previously described. The closure of switch 38—39 energizes the toaster circuit to commence the toasting cycle.

Upon release of knob 4, the clockwork mechanism commences its timing operation and the carriage 32 is slowly moved upward. At the same time, the thermostatic element 63 is heated and at a predetermined temperature it opens switch 49, whereupon the thermostatic element cools and permits the switch to close. This alternate opening and closing of the switch may take place repeatedly during the entire toasting cycle, depending on the setting of knob 5, and serves to intermittently energize the toaster according to the position of switch 49. When the latching member 25 is cammed to non-latching position by the cam plate 36, the bread carriage is moved rapidly upward by the spring 20 and the switch 38—39 is opened, thus terminating the toasting cycle. The carriage support 13 moves the carriage 32 upwardly through the remainder of its travel to its inoperative position. Any energy remaining in the clock spring 42 is released and the upward movement of rack 44 continues without performing any function.

Considering in detail, the adjustments which are effected by means of the control knobs, if it is desired to make light colored toast, the knob 6 is rotated clockwise to increase the clock speed and thereby shorten the duration of the toasting cycle. On the other hand, if darker toast is desired, the knob 6 is rotated counter-clockwise to decrease the clock speed and thereby lengthen the duration of the toasting cycle.

For any particular setting of the color control knob 6, the rotation of the crispness control knob 5 will vary the crispness of the toast without changing the color. If it is desired to make soft toast, the knob 5 is rotated clockwise, causing switch 49 to move away from the end of rod 61. This increases the average toasting rate since such adjustment of the switch causes its total closed time to be greater. At the same time, the arm 30 is moved backward, thus decreasing the duration of the toasting cycle and maintaining the desired color. If crisper toast is desired, the knob 5 is rotated counter-clockwise, thus moving switch 49 toward the end of rod 61, which decreases the average toasting rate. At the same time, the arm 30 is moved forward to increase the duration of the toasting cycle and thus maintain the desired color.

It will be understood that the cam elements 36 and 67 are designed to effect the desired correlation of the toasting time with the average toasting rate so as to maintain the desired color irrespective of the crispness setting.

Figure 9:
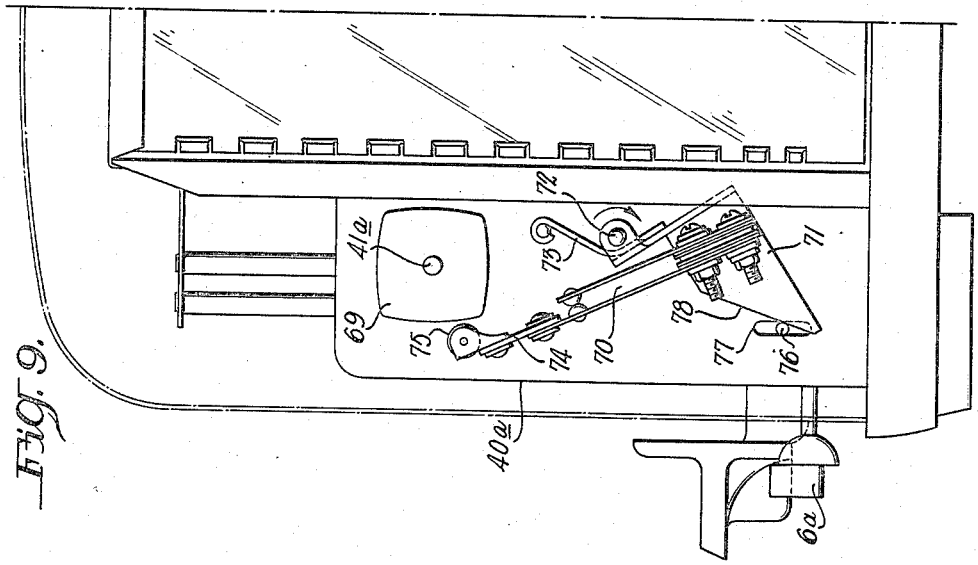
Fig. 9 is a similar view taken from the right-hand side of the same.
Figure 8:
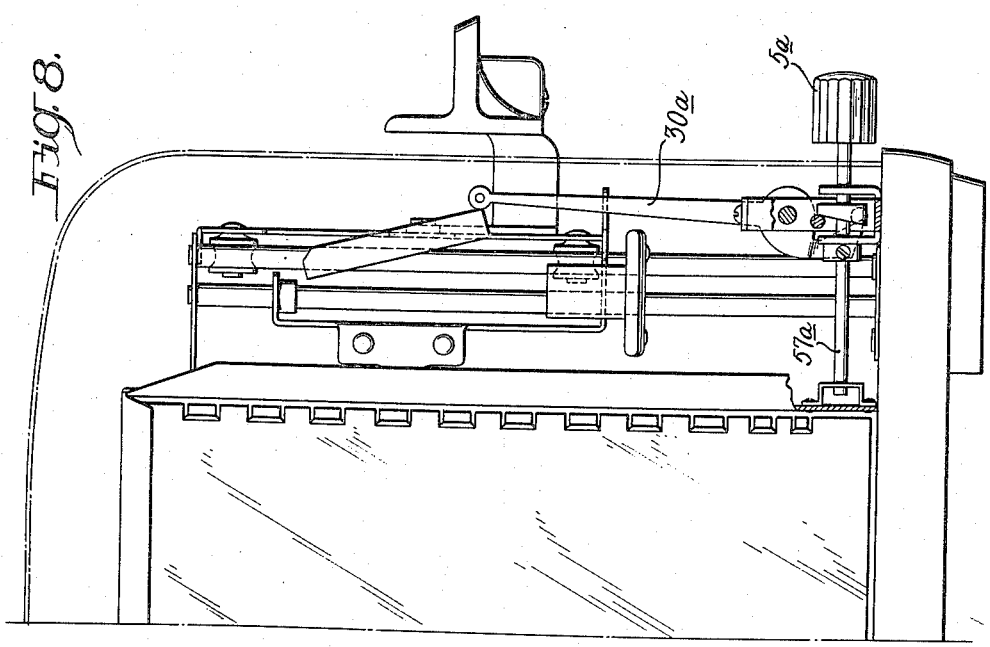
Fig. 8 is a fragmentary side elevational view of a modified form of the toaster taken from the left-hand side.

In Figs. 8 and 9, there is illustrated a modified form of the toaster in which the intermittent energy input is effected by a mechanical interrupter device, rather than by a thermostatic switch as in the above-described embodiment. In this instance, the thermostatic switch mechanism is omitted, the shaft 57a (Fig. 8) and the knob 5a merely serving to position the arm 30a. On the shaft 41a (Fig. 9) of the clockwork 40a, there is provided a cam 69 which forms part of an interrupter mechanism. A switch 70 is carried by bracket 71 pivotally mounted on the clock housing 72. A spring 73 urges the pivoted switch assembly clockwise, as indicated by the arrow in Fig. 9. The left-hand blade of switch 70 carries an insulating extension 74 upon which there is mounted a roller 75 engageable by the cam 69.

It is characteristic of the commonly employed variable-speed clockwork, such as is used here, that the adjusting knob 6a operates a rack and pinion (not visible) which moves a pin 76 in a vertical slot 77 in the side of the clock housing. The pin moves downward in response to increased speed adjustment and upward in response to decreased speed adjustment. Advantage is here taken of this moving pin which is already present in the clockwork. The pin is extended and is caused to move the pivoted switch assembly through the medium of a cam surface 78 on bracket 71. The switch 70 takes the place of the thermostatic switch employed in the previous embodiment.

In this instance, the functions of the control knobs are reversed and the adjustment of knob 5a adjusts the time duration of the toasting cycle by varying the position of arm 30a, thereby determining the color of the toast desired. The setting of the knob 6a adjusts both the speed of the clockwork and the position of switch 70 relative to cam 69, the latter adjustment determining the average rate of toasting. Thus, in this instance, the correlation between the toasting time and the toasting rate is affected by the rotation of knob 6a.

In operation, the knob 5a is set for the desired color of the toast and the knob 6a is set for the desired degree of crispness. The correlation affected by knob 6a enables the attainment of the desired color of the toast irrespective of the setting of the knob 6a. If it is desired to make light toast, the knob 5a is rotated clockwise, thus moving arm 30a backward to decrease the duration of the toasting cycle. On the other hand, if dark toast is desired, knob 5a is rotated counter-clockwise, thus moving arm 30a forward to increase the duration of the toasting cycle.

For any particular setting of the color control knob 5a, adjustment of knob 6a will vary the crispness without changing the desired color. If it is desired to make soft toast, knob 6a is rotated clockwise, causing pin 76 to move downward in slot 77. This moves the switch 70 away from cam 69, causing an increase in the average toasting rate, since such adjustment of the switch causes its total closed time to be greater. At the same time, the clockwise rotation of knob 6a increases the clock speed, thus decreasing the duration of the toasting cycle to maintain the desired color.

If crisper toast is desired, the knob 6a is rotated counter-clockwise, causing pin 76 to move upward in slot 77. This causes switch 70 to move toward cam 69, thereby decreasing the average toasting rate. At the same time, the clock speed is decreased, thus increasing the duration of the toasting cycle so as to maintain the desired color.

Apart from the above-noted differences, the device is constructed and operates in the same manner as the previous embodiment.

Thus, it will be seen that the present invention provides a simple toaster construction embodying both color and crispness control and novel correlation between the two controls. It will be understood, of course, that the invention is capable of various modifications and embodiments other than those illustrated. For example, in the first described embodiment, the thermostat need not be located in one of the toaster wells but may be located in any suitable position. Such modifications will be clearly apparent to those skilled in the art.

I claim:

1. In an automatic bread toaster, a clockwork for controlling the toasting operation, means for varying the duration of the toasting cycle to obtain toast of a desired color, means for varying the average energy input to the toaster throughout the toasting cycle, so as to vary the average toasting rate and thereby obtain varying degrees of crispness of the toast, said last-named means including a manually-adjustable switch operable by said clockwork to supply energy intermittently to the toaster, and means for correlating the speed of said clockwork with the adjustment of said switch so as to obtain the desired color of the toast irrespective of variation of the degree of crispness.

2. In an automatic toaster, means movable between operative and inoperative positions for initiating and terminating the toasting operation, means urging said movable means to its inoperative position, means for latching said movable means in its operative position, means for tripping said latching means to terminate the toasting cycle, means for varying the duration of the toasting cycle to obtain toast of a desired color, means for varying the average energy input to the toaster throughout the toasting cycle, so as to vary the average toasting rate and thereby obtain varying degrees of crispness of the toast, and means responsive to adjustment of said last-named means for correlating the time duration of the toasting cycle with the toasting rate so as to obtain the desired color of the toast irrespective of the variation of the degree of crispness.

3. In an automatic toaster, means movable between operative and inoperative positions for initiating and terminating the toasting operation, means urging said movable means to its inoperative position, means for latching said movable means in its operative position, means for tripping said latching means to terminate the toasting cycle, variable speed clock means for varying the duration of the toasting cycle to obtain toast of a desired color, means for varying the average energy input to the toaster throughout the toasting cycle, so as to vary the average toasting rate and thereby obtain varying degrees of crispness of the toast, and means for correlating said latch-tripping means with said last-named means, so as to correlate the time duration of the toasting cycle with the toasting rate and thereby obtain the desired color of the toast irrespective of the variation of the degree of crispness.

4. In an automatic toaster, means movable between operative and inoperative positions for initiating and terminating the toasting operation, means urging said movable means to its inoperative position, means for latching said movable means in its operative position, means for tripping said latching means to terminate the toasting cycle, variable speed clock means for actuating said latch-tripping means, means for adjusting said latch-tripping means so as to vary the duration of the toasting cycle to obtain toast of a desired color, means for varying the average energy input to the toaster throughout the toasting cycle, so as to vary the average toasting rate and thereby obtain varying degrees of crispness of the toast, and means for correlating the speed of said clock means with said last-named means, so as to correlate the time duration of the toasting cycle with the toasting rate and thereby obtain the desired color of the toast irrespective of the variation of the degree of crispness.

5. In an automatic toaster, means movable between operative and inoperative positions for initiating and terminating the toasting operation, means urging said movable means to its inoperative position, means for latching said movable means in its operative position, means for tripping said latching means to terminate the toasting cycle, said latch-tripping means including a movable element and an adjustable element, variable speed clock means for actuating said movable element, means for adjusting said clock means, thus varying the duration of the toasting cycle to obtain toast of a desired color, means for varying the average energy input to the toaster throughout the toasting cycle, so as to vary the average toasting rate and thereby obtain varying degrees of crispness of the toast, and means for adjusting said adjustable element in correlation with said last-named means, so as to correlate the time duration of the toasting cycle with the toasting rate and thereby obtain the desired color of the toast irrespective of the variation of the degree of crispness.

6. In an automatic toaster, means movable between operative and inoperative positions for initiating and terminating the toasting operation, means urging said movable means to its inoperative position, means for latching said movable means in its operative position, means for tripping said latching means to terminate the toasting cycle, said latch-tripping means including a movable element and an adjustable element, variable speed clock means for actuating said movable element, means for adjusting said adjustable element so as to vary the duration of the toasting cycle to obtain toast of a desired color, means for varying the average energy input to the toaster throughout the toasting cycle, so as to vary the average toasting rate and thereby obtain varying degrees of crispness of the toast, and means for adjusting the speed of said clock means in correlation with said last-named means, so as to correlate the time duration of the toasting cycle with the toasting rate and thereby obtain the desired color of the toast irrespective of the variation of the degree of crispness.

7. In an automatic bread toaster, manually-adjustable means for controlling the duration of the toasting cycle to obtain toast of a desired color, manually-adjustable means for controlling the average energy input to the toaster, to thereby control the toasting rate and thus obtain a desired degree of crispness of the toast, and means responsive to adjustment of said crispness control means for varying the duration of the toasting cycle in correlation with the toasting rate, so as to obtain the desired color irrespective of the crispness control adjustment.

8. In an automatic bread toaster, manually-adjustable means for controlling the duration of the toasting cycle to obtain toast of a desired color, manually-adjustable means for controlling the average energy input to the toaster, to thereby control the toasting rate and thus obtain a desired degree of crispness of the toast, said last-named means including a manually-adjustable thermostatic switch mechanism for supplying energy intermittently to the toaster, and means responsive to adjustment of said crispness control means for varying the duration of the toasting cycle in correlation with the toasting rate, so as to obtain the desired color irrespective of the crispness control adjustment.

9. In an automatic bread toaster, manually-adjustable means for controlling the duration of the toasting cycle to obtain toast of a desired color, manually-adjustable means for controlling the average energy input to the toaster to thereby control the toasting rate and thus obtain a desired degree of crispness of the toast, said last-named means including a spring-energized mechanically-operated switch mechanism, and means responsive to adjustment of said crispness control means for varying the duration of the toasting cycle in correlation with the toasting rate, so as to obtain the desired color irrespective of the crispness control adjustment.

10. In an automatic bread toaster, manually-adjustable means for controlling the duration of the toasting cycle to obtain toast of a desired color, manually-adjustable means for controlling the average energy input to the toaster, to thereby control the toasting rate and thus obtain a desired degree of crispness of the toast, and means responsive to adjustment of one of said control means for correlating the duration of the toasting cycle and the toasting rate so as to obtain the desired color and the desired degree of crispness.

11. In an automatic toaster, means movable between operative and inoperative positions for initiating and terminating the toasting operation, means urging said movable means to its inoperative position, means for latching said movable means in its operative position, spring-operated means for tripping said latching means after a time interval, adjustable means for controlling the latch-tripping action so as to control the duration of said interval, other adjustable means for controlling the speed of operation of the spring-operated means also to control the duration of said interval, adjustable means for controlling the toasting rate during said interval, and means coordinating one of said duration-controlling means with the last-named adjustable means so as to correlate the duration of the toasting cycle with the toasting rate to obtain both a selected color and a selected degree of crispness of the toast.

CHARLES ROGER TURNER.